US008540796B1

(12) United States Patent
van Swol et al.

(10) Patent No.: US 8,540,796 B1
(45) Date of Patent: Sep. 24, 2013

(54) SINTERING AND RIPENING RESISTANT NOBLE METAL NANOSTRUCTURES

(75) Inventors: Frank B. van Swol, Tijeras, NM (US); Yujiang Song, Albuquerque, NM (US); John A. Shelnutt, Tijeras, NM (US); James E. Miller, Albuquerque, NM (US); Sivakumar R. Challa, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1128 days.

(21) Appl. No.: 12/107,803

(22) Filed: Apr. 23, 2008

(51) Int. Cl.
*B22F 1/00* (2006.01)
*B22F 1/02* (2006.01)
*C22C 1/05* (2006.01)

(52) U.S. Cl.
USPC .............................. 75/255; 75/345

(58) Field of Classification Search
USPC ................................ 977/755, 900
See application file for complete search history.

(56) References Cited

U.S. PATENT DOCUMENTS
2007/0231674 A1  10/2007  Shelnutt et al.

OTHER PUBLICATIONS

Song et al. (Foamlike Nanostructures Created from Dendritic Platinum Sheets on Liposome (Chem. Mater. 2006, 18, 2335-2346).*
Yujiang Song et al, "Synthesis of Platinum Nanocages by Using Liposomes Containing Photocatalyst Molecules" Agnew. Chem. Int. Ed., 2006, vol. 45, pp. 8126-8130.
Yujiant Song et al, "Foamlike Nanostructures Created from Dendritic Platinum Sheets on Liposomes", Chem. Mater, 2006, vol. 18, pp. 2335-2346.
Yujiang Song et al, "Web-Based Supporting Information for Controlled Synthesis of 2-D and 3-D Dendritic Platinum Nanostructures", Advanced Materials Laboratory, Sandia National Laboratories, Albuquerque, NM 87106, Journal of American Chemical Society, 2004.
Yujiang Song et al, "Controlled Synthesis of 2-D and 3-D Dendritic Platinum Nanostructures", Journal of American Chemical Society, 2004, vol. 126, pp. 635-645.
U.S. Appl. No. 10/887,535, filed Jul. 8, 2004.
U.S. Appl. No. 11/840,067, filed Aug. 16, 2007.
U.S. Appl. No. 11/542,506, filed Oct. 3, 2006.
Masayuki Shirai et al, "Formation of platinum nanosheets between graphite layers", Chem. Commun., 2000, pp. 623-624.

* cited by examiner

*Primary Examiner* — Weiping Zhu
(74) *Attorney, Agent, or Firm* — Carol I. Ashby

(57) ABSTRACT

Durable porous metal nanostructures comprising thin metal nanosheets that are metastable under some conditions that commonly produce rapid reduction in surface area due to sintering and/or Ostwald ripening. The invention further comprises the method for making such durable porous metal nanostructures. Durable, high-surface area nanostructures result from the formation of persistent durable holes or pores in metal nanosheets formed from dendritic nanosheets.

19 Claims, 5 Drawing Sheets

SINTERING AND RIPENING RESISTANT NOBLE METAL NANOSTRUCTURES

The United States Government has rights in this invention pursuant to Department of Energy Contract No. DE-AC04-94AL85000 with Sandia Corporation.

CROSS-REFERENCE TO RELATED APPLICATIONS

This application is related to the following copending applications or related patents:

"Dendritic Metal Nanostructures," U.S. patent application Ser. No. 10/887,535, filed Jul. 8, 2004, which is incorporated herein by reference.

"Dendritic Metal Nanostructures," U.S. patent application Ser. No. 11/840,067, filed as a divisional application of the preceding on Aug. 16, 2007, which is incorporated herein by reference.

"Dendritic Metal Nanostructures For Fuel Cells And Other Applications," published U.S. Pat. Appl. 2007/0231674, filed Nov. 29, 2006, which is incorporated herein by reference.

"Method of Photocatalytic Nanotagging," U.S. patent application Ser. No. 11/542,506, filed on Oct. 3, 2006, which is incorporated herein by reference.

BACKGROUND OF THE INVENTION

This invention relates to the need for morphologically stable metal catalysts where the morphology on the nanometer scale does not rapidly degrade during use of the catalyst. One example where catalyst degradation during operation is a serious problem is in the area of fuel cells. Fuel cells are an efficient and environmentally benign source of energy that shows promise for applications requiring fast start and flexible operational properties, as in light-duty vehicles. However, successful commercialization of fuel cells in this application has been impeded by the lack of durability and high cost of some fuel cell materials. A major factor in determining the lifetime of a fuel cell stack is the loss of active surface area of the platinum-based catalysts. Loss of active surface area can result from oxidation, dissolution, particle migration, sintering, coursening, and Ostwald ripening. Previous attempts to solve this problem have focused on alloying platinum with non-precious metals, such as cobalt or nickel, and on supporting platinum on various electrically conductive materials, such as carbon black or carbon nanotubes.

This present invention embodies a different approach to obtaining durable catalysts for which the surface area does not rapidly degrade due to such processes as sintering and Ostwald ripening.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

Figure 1A:
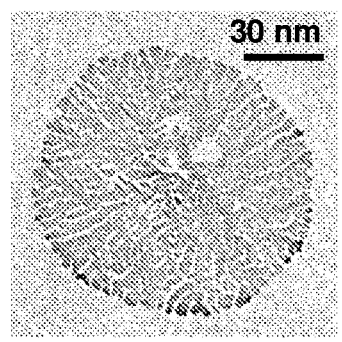
FIG. 1 presents bright-field transmission electron micrographs (TEMs) showing the structural evolution of a typical flat Pt dendritic nanosheet under heating by an electron beam for different time periods. 1a: original dendritic nanosheet. 1b: Nanosheet after 40 minutes of irradiation. 1c: Nanosheet after 100 minutes of irradiation. 1d: Nanosheet after 110 minutes of irradiation.
Figure 1B:
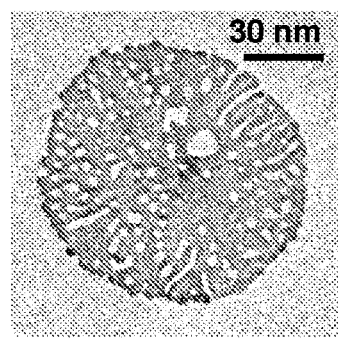
Figure 1C:
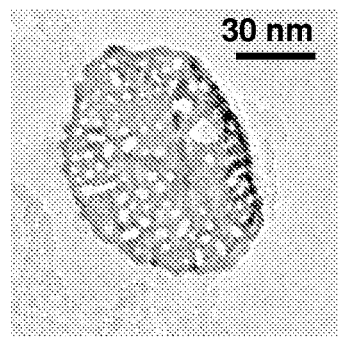
Figure 1D:
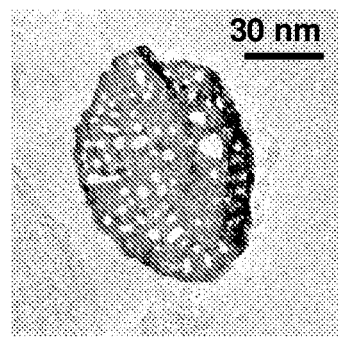

This invention comprises durable porous metal nanostructures comprising thin metal nanosheets that are metastable under some conditions that commonly produce rapid reduction in surface area due to sintering and/or Ostwald ripening. The invention further comprises the method for making such durable porous metal nanostructures. The high surface area results from the formation of persistent (durable) holes or pores in metal nanosheets formed from dendritic nanosheets.

Circular flat dendritic nanosheets and intricate foam-like structures composed of curved nanosheets can be prepared via wet-chemistry approaches using either multilamellar vesicles or aggregated unilamellar liposomes as templates, respectively. Dendritic metal nanocages can be prepared by coalescence of dendritic nanosheets growing within a bilayered liposome. The syntheses of such structures have been reported by the inventors in the following several publications, which are incorporated herein by reference:

Y. J. Song et al., "Controlled Synthesis of 2-D and 3-D Dendritic platinum Nanostructures," J. Amer. Chem. Soc. Vol. 126 (2004) pp. 635-645.

Y. J. Song et al., "Foamlike Nanostructures Created from Dendritic Platinum Sheets on Liposomes," Chem. Mater. vol. 18 (2006) pp. 2335-2346.

Y. J. Song et al., "Synthesis of Platinum Nanocages by Using Liposomes Containing Photocatalyst Molecules," Angew. Chem. Int. Ed. vol. 45 (2006) pp. 8126-8130.

Circular flat dendritic nanosheets (FIG. 1a) and intricate foam-like structures composed of curved nanosheets (FIG. 2a) were prepared via wet-chemistry approaches using either multilamellar vesicles or aggregated unilamellar liposomes as templates, respectively. The foam-like structures can be spheroidal or can be irregular in shape. For the embodiments described herein the following synthetic procedures were employed. Alternative procedures may be employed to prepare the dendritic nanostructures that are used in embodiments of this present invention.

Potassium tetrachloroplatinate ($K_2PtCl_4$), L-ascorbic acid (AA), 1,2-dioctadecanoyl-sn-glycero-3-phosphocholine (DSPC), and cholesterol were employed. Aqueous solutions were prepared with ultrapure water from a Barnstead Nanopure water system (Chesterland, Ohio). A stock solution of the platinum(II) complex (20 mM) was prepared by dissolving $K_2PtCl_4$ in water and allowing it to age for at least 24 h before use. Stock solutions of DSPC (1.0 mM) and cholesterol (1.0 mM) were prepared by dissolving the respective compounds in chloroform. Nafion 112 or NRE212 membranes (DuPont, Wilmington, Del.) were used in the membrane electrode assemblies (MEA).

For use in some embodiments, multilamellar liposomes (vesicles) were prepared by adding DSPC (79 mg) to 100 mL of ascorbic acid solution (150 mM) followed by mild sonication for 2 minutes using an ultrasonic cleaner. This procedure gave a final DSPC concentration of 1 mM. The average diameter of the vesicles, as determined by dynamic light scattering measurements using a Beckman Coulter N5 submicron particle size analyzer, was 400 nm.

For use in some embodiments, unilamellar liposomes were prepared via an extrusion process. For example, 50 mL of the 1.0-mM DSPC and the 1.0-mM cholesterol stock solutions were mixed in a glass tube. After evaporating the chloroform under vacuum, lipid films were formed on the wall of the tube. After drying overnight, 100 mL of ultrapure water was added and the mixture was heated for 1 hour at 65° C. in a water bath. The sample was then vortexed to facilitate the formation of multilamellar vesicles. Finally, the mixture was extruded through a 200-nm porous polycarbonate filter. The extrusion process was repeated a total of 10 times. The average diameter of the unilamellar liposomes, as determined by dynamic light scattering measurements, was 140-170 nm.

For some embodiments, circular dendritic platinum nanosheets with a range of diameters between 30 and 500 nm were prepared using the multilamellar DSPC vesicles in ascorbic acid solution as templates. To prepare the dendritic nanosheets, 100 mL of a suspension of the multilamellar DSPC liposomes was mixed with 100 mL of the aged platinum complex (20 mM) in a glass reaction vessel. The reaction mixture was left under ambient conditions for at least 100 minutes to ensure that Pt reduction was complete. A TEM of a dendritic platinum nanosheet is presented in FIG. 1a.

For some embodiments, foam-like platinum nanospheroids or foam-like balls were synthesized by adding 100 mL of the suspension of the unilamellar liposomes prepared in water to a glass reaction vessel, followed by the addition of 100 mL of aged platinum complex (20 mM) and 2.64 g of solid ascorbic acid. After mixing, the cloudy liposome suspension appears to flocculate. The reaction mixture was then swirled to fully dissolve the ascorbic acid and left under ambient conditions for many minutes, for example, for 100 or more minutes, to ensure that Pt reduction was complete. A TEM of a portion of a dendritic platinum nanospheroid is presented in FIG. 2a. For some embodiments, the foam-like nanostructures formed by this procedure can have an irregular shape.

For some embodiments, hollow dendritic platinum nanospheres (nanocages) can be employed as the starting dendritic nanostructures. The dendritic platinum nanospheres are synthesized by growing platinum dendrites within the bilayer of a liposome. A photocatalyst for metal reduction is incorporated into the liposomal bilayer. Photocatalytic reduction of a metal ion or metal complex produces metal seed particles within the bilayer. The seed particles grow as dendritic sheets within the bilayer. Many dendritic sheets grow until they link with neighboring nanosheets to form a nanocage. For one example synthesis of nanocages, tin-octaethylporphyrin-containing liposomes were prepared with a composition of 1:1 DSPC/cholesterol mole ratio. (DSPC=1,2-dioctadecanoyl-sn-glycero-3-phosphocholine) The liposomes were mixed with Pt ion solution and ascorbic acid and the resulting mixture was illuminated to form Pt seed particles inside the bilayer of the liposome. Subsequent autocatalytic growth of Pt nanodendrites within the bilayer forms the nanocage. Additional details for the synthesis of dendritic nanocages have been reported in Y. Song et al., "Synthesis of Platinum Nanocages by Using Liposomes containing Photocatalyst Molecules," Angew. Chem. Int. Ed. Vol. 45 (2006) pp. 8126-8130, and in U.S. patent application Ser. No. 11/542,506, which is incorporated herein by reference.

Dendritic metal nanostructures derived from these three exemplary synthetic techniques may be employed as starting dendritic metal nanostructure for various embodiments of this invention. Thin dendritic metal nanosheets made by other methods may also be used in embodiments of this invention. Thin dendritic metal nanosheets have a vertical thickness (thickness normal to the sheet plane) less than approximately 20 nm. Such thin sheets with thicknesses less than 10 nm are referred to hereafter as "two-dimensional" nanosheets or nanostructures. For these substantially two-dimensional nanostructures, the vertical thickness does not vary proportionately with the lateral dimension of the dendritic nanostructure. These types of structures are referred to herein as dendritic metal nanosheets.

FIG. 1 presents bright-field transmission electron micrographs of a typical flat nanosheet that has been heated using an electron beam to induce diffusion and cause the dendritic nanosheet to form a porous nanosheet. For the nanosheets illustrated in FIG. 1, a 200-KeV, approximately 8.5 A/cm² electron beam irradiated the nanosheet for increasing lengths of time. Transmission electron microscopy (TEM) shows that the flat dendritic sheets are approximately 2-nm thick and up to 500 nm in diameter. Typically, the arms of the dendrites are 3-4-nm wide and the separation of the arms is approximately 1-2 nm. The progress of the sintering of the nanosheet of FIG. 1a is illustrated in FIGS. 1b-1d. During the first 40 minutes of irradiation, the dendritic branches or arms fuse together in some areas along the gaps between the branches (FIG. 1b). The 110-nm diameter flat nanosheet (FIG. 1a) also shrinks slightly to 108 nm (FIG. 1b). After 100 and 110 minutes (FIGS. 1c and 1d), the sheet has continued shrinking and has curled somewhat. While the nanopores have changed shape somewhat as the beam-induced transformation continues, many of them retain approximately the same area as observed after 40 min. Examination of the TEM images shows that the pores can generally be associated with specific spaces between the arms of the dendrite that are present before heating occurs. Many of the pores persist for the entire period of heating and thus act to preserve surface area. We apply the terms metastable and durable to describe the property of the porous nanostructures wherein a substantial fraction of the pores formed during the initial phase where portions of the gaps between dendritic branches close are retained for an extended period of time; this metastability leads to retention of a larger fraction of the initial surface area of the dendritic nanostructure than would occur if the dendritic nanostructure formed a nonporous nanostructure upon sintering.

The nanoporous material illustrated in FIG. 1 was heated using an electron beam. However, other methods of heating to induce pore formation may be used. These include but are not restricted to irradiating with charged particles such as ions or electrons, irradiating with light, heating by at least one of convection and conduction, such as in an oven, and heating by electrical current.

In different embodiments, a variety of methods may be used to induce diffusion of atoms that lead to closure of portions of the gaps between dendritic branches. The term diffusion in this application is employed to include various mechanisms for the transport of atoms: diffusion along a surface, diffusion by an atom entering the vapor phase from a surface and redepositing on the surface, and diffusion by an atom dissolving from a surface into a solution followed by redepositing on the surface. This includes Ostwald ripening, herein referred to as ripening. Diffusion can occur in a vacuum, gaseous atmosphere, or liquid environment.

The driving force for sintering and ripening processes is the change in surface free energy. Conditions that change the surface free energy landscape can affect rates of sintering and/or ripening. Several factors may be changed singly or in combination to change the surface free energy landscape and thereby affect diffusion. Manipulation of temperature and of chemical potential gradients affects the dissolution/deposition processes involved in sintering and ripening. Placing a dendritic nanostructure in solution and varying the solution conditions such as, for example, pH, ionic strength, solution composition, etc. can affect the ripening/sintering process. Diffusion as defined for the purpose of this invention can be induced by various chemical reactions at the surface, including catalytic reactions, electrochemical reactions, coordination reactions, and various solution-surface interactions such as acid-promoted or base-promoted interactions.

The metastability of the porous structure formed from the dendritic nanostructure is derived from the characteristics of diffusion for dendritic structures. The resistance to the transformation of the nanostructures from dendritic structures with high surface-to-volume ratios into particles with much lower surface-to-volume ratios can be explained to a large extent in terms of the vapor pressure or solubility of the porous sheets that form as sintering/ripening begins. This is expressed by the Kelvin equation, which can be written in terms of the of the radius of curvature as $$\frac{f(r)}{f(\infty)} = e^{\frac{2\gamma V}{rRT}} \quad (1)$$

Here, f(r) denotes the vapor pressure (vapor case) or the solubility (solution case) for a surface with radius of curvature r, and is a measure of how many atoms have left the solid nanostructure to reach an equilibrium between the structure and the vapor (solution). In equation (1), $\gamma$ is the interfacial tension for the solid-vapor (vapor case) or the solid-solution (solution case) interface; T is the absolute temperature, R is the gas constant, and V is the molar volume of the solid structure The exponent, $2\gamma V/rRT$, has the same sign as the curvature, r, and can be zero, positive or negative. Thus, for the familiar case of small particles (i.e., r>0) we have f(r)>f($\infty$) indicating that the vapor pressure (solubility) is enhanced over the value found over a flat surface. For a flat sheet of sufficient extent, r is approximately equal to infinity, provided we can ignore the contribution curved outer edge and hence, the vapor pressure (solubility) is that of a flat surface. For a porous nanosheet, the radius of the pores is both negative (i.e., r<0) and small, so that f(r) is substantially less than f($\infty$), significantly lowering the vapor pressure (solubility) compared to the value for a flat surface. This implies that there is less unbound Pt to diffuse to a distant location on the sheet where it can deposit in a ripening/sintering process.

This more favorable difference in diffusional driving force for the porous nanostructures formed from the dendritic nanostructures enables retention of a higher surface area for a longer time during both gas-phase sintering and ripening and liquid-based ripening.

A Monte Carlo (MC) lattice model simulation provides an understanding of the process of forming durable porous metal nanostructures based on thin and/or substantially two-dimensional metal sheets. The MC simulations, which incorporated both surface and gas/liquid phase diffusion processes, are based on a classical 3-D lattice gas (Ising) model consisting of atoms occupying individual lattice sites. The Metropolis Monte Carlo algorithm was used, with Kawasaki dynamics used to mimic the hoping motion of atoms in the crystal phase. The algorithm mimics the diffusion mechanisms of solids and liquids and is well-suited for studying Ostwald ripening processes. Comparison of MC simulation results with experimental measurements of the came process can allow one to equate a number of MC moves with a certain passage of time. The MC simulations provide information about the time-evolution and metastable forms to be derived from a given dendritic nanostructure.

Figures 3A, 3B:
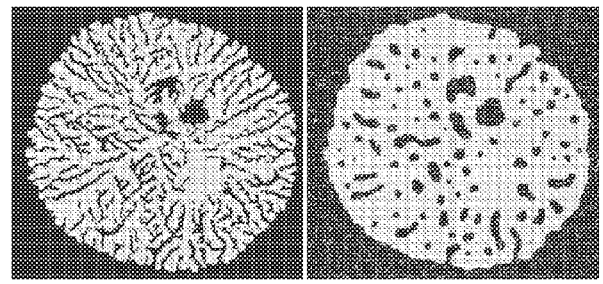
FIG. 3 illustrated the calculated structure that forms by diffusion. 3a: starting dendritic nanosheet of approximately 8 atomic layers thick and approximately 110 nm diameter (digitization of nanosheet in FIG. 1a). 3b: porous nanosheet formed by diffusion process after 16,000 Monte Carlo (MC) calculation cycles.
Figure 4:
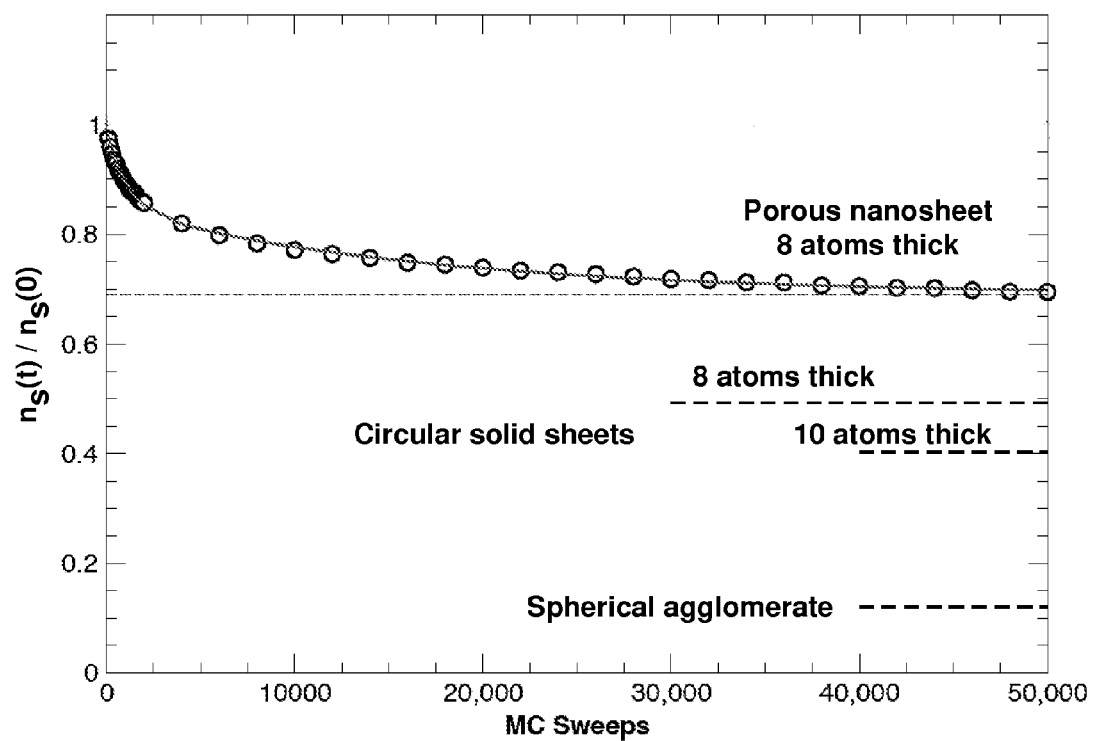
FIG. 4 illustrates the calculated number of surface sites at different coarsening times (in units of MC cycles) and limiting values for different idealized nanosheets and nanostructures. The solid curve represents a double exponential fit to the surface site fraction in a dendritic nanosheet.

The dendritic nanosheet illustrated in FIG. 1a was digitized and the Pt thickness set at a uniform 8 atoms (2.6 nm) to approximate the original dendritic structure of the nanosheet. FIG. 3 shows two snapshots of the dendrite at 0 (FIG. 3a) and 16,000 Monte Carlo (MC) sweeps (FIG. 3b) from a simulation run at a temperature of 80% of the roughening temperature for the lattice model. An atomistically smooth surface remains smooth (or in the original crystal shape) at T=0, but becomes increasingly rough as the temperature rises to the roughening temperature, and cannot be smooth (or in the original crystal shape) above this temperature. More precisely, there is a finite two-dimensional interface between solid (liquid) and vapor in three dimensions and its thickness diverges logarithmically with system size in the capillary wave approximation. In lattice gas model of such 3D systems, this thickness is believed to diverge only for temperatures above a certain roughening temperature $T_R$ whereas below $T_R$ it remains finite in the thermodynamic limit. The snapshot in FIG. 3b shows the formation of many nanopores and fissures, similar to those seen in the TEM image in FIG. 1b. These structural features mostly originate early on in the simulation from narrow spaces between dendritic arms, and then persist for long periods. The thickness of the sheet is also persistent, remaining close to the starting thickness of 8 atoms. The calculated decrease in the surface area due to the morphological changes between the structures in FIGS. 3a and 3b is 25%. In addition, the area decrease follows closely a double exponential decay—a fast process associated with the topological change from a dendritic to a porous (holey) sheet and a slow process associated with the evolution of the pores and the slight thickening of the sheet. Extrapolated to infinite time, together these processes result in a loss of only 31% of the initial area. A far greater loss of area of 51% would occur for conversion to a solid 8-atom thick sheet without the persistent pores, increasing to 60% loss after thickening of the sheet to 10 atoms (FIG. 4) Formation of an equivalent solid sphere would decrease the area by 88%.

Detailed simulations for nanosheets with narrow fissures (gaps between dendritic branches) illustrate their evolution into pores. In a typical simulation, the fissure seals itself off and withdraws from the edge of the sheet, and also shortens and seals off at one or more points along the fissure to form two or more pores Elongated nanopores become more circular and continue to evolve getting larger or smaller during the diffusional process. The pores can persist for many times longer than it takes for them to form. Simulations for pores of differing sizes in sheets of differing thicknesses show that pores with a diameter close to the sheet thickness are metastable for extended periods of time. Pores that are smaller than this critical size disappear rather quickly, and pores larger than the critical size grow larger and eventually disrupt the structure of the sheet if close enough to the sheet edge. The simulations also show that an initial porous sheet thickness of 7 or 8 atoms (2-3 nm) is good for sheet stability. The 2-nm thick dendritic Pt sheets are close to this thickness, and the porous sheets that evolve from them provide a large and metastable surface area that can serve as a durable nanostructured catalyst. Similar behavior will result with different metals and metal alloys with suitable initial dendritic structures and thickness.

For some embodiments wherein the formation of durable porous nanostructures occurs in a membrane electrode assembly (MEA), purification of the dendritic nanostructures is as follows. Variations of the following conditions may also be used. The dendritic platinum nanosheets and foam-like structures, such as foam-like nanospheroids or foam-like balls, were purified by batch processing of 50-mL quantities of the reaction mixture. The batches were initially centrifuged at 3500 RPM for at several minutes, for example for 5 or more minutes. The supernatant was removed, 45 mL of fresh ultrapure water added to the black precipitate, and the material re-suspended by mild sonication for 30 minutes. The centrifugation/re-suspension procedure was repeated a total of six times to remove as much surfactant, salts and other impurities as possible. The resulting black slurry was dried in an oven for 12 hours at 75° C.

MEAs were fabricated from the dendritic Pt nanomaterials by brush-painting aqueous slurries with a 9:1 Pt/Nafion ratio by weight onto both sides of Nafion 112 or 212 membranes (DuPont, Wilmington, Del.) to achieve a Pt loading of 7, 2, or 0.4 mg/cm. Reference MEAs were fabricated in the same way using unsupported Pt black or commercial carbon-supported Pt nanoparticles. Microporous carbon papers (250-μm thick) were applied to both sides of the electrocatalyst-coated membranes to serve as the gas diffusion layers. Next, the MEA was compressed in 5-cm$^2$ cell hardware that was controlled with a fuel-cell test station. The MEAs were run for a break-in period of approximately 3.5 hours at 0.5 V prior to obtaining data on unsupported pure Pt electrocatalysts, which removes the influence of a conducting support and alloying effects.

Figure 5:
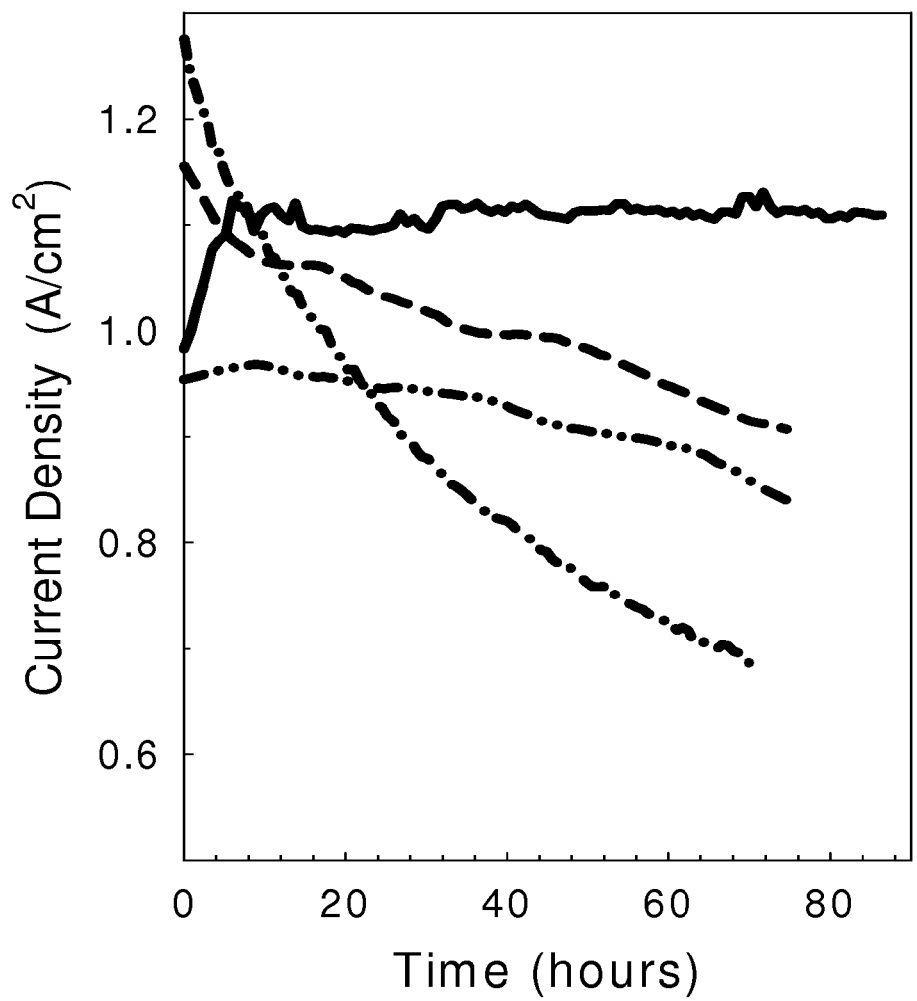
FIG. 5 illustrates the current density versus operation time for MEAs operating at 0.5 V. Solid line=Pt nanospheroid (7 mg Pt/$cm^2$). Dashed line=Pt nanosheets (7 mg Pt/$cm^2$). Dash dot line=platinum black (7 mg Pt/$cm^2$). Dash dot dot line=0.4 mg Pt/$cm^2$ carbon-supported Cabot Dynalyst 50KR1/50 wt % Pt on Ketjen Black.

The durability of the porous metal nanostructures is demonstrated by their performance as catalysts in MEAs. The changes in the current densities of the MEAs (7 mg Pt/cm$^2$) during nominal 75-h fuel cell tests at 0.5 V are shown in FIG. 5. After a brief initial increase, the MEA made from the Pt nanospheres (solid line) exhibited no current degradation over the course of the test (86 h). In contrast, the decline in current density during the test for the Pt black MEA (dash dot line) was 47% in 70 h. The current density for the flat nanosheets (dashed line) exhibits an intermediate decrease of 20% in 75 hr. The initial current density increase for the nanospheres may derive from the electrochemical oxidation of residual organic molecules left over from their preparation (based on a previous thermal gravimetric analysis). The current density curve for a MEA prepared by similar procedures using a modern commercial electrocatalyst from Cabot is also given for comparison in FIG. 5 (dash dot dot line); the Pt loading of 0.4 mg/cm$^2$ used is typical for carbon-supported Pt nanoparticles. MEAs prepared using the unsupported Pt nanospheres at Pt loadings of 2 or 0.4 mg Pt/cm$^2$ also show little degradation.

Figure 2A:
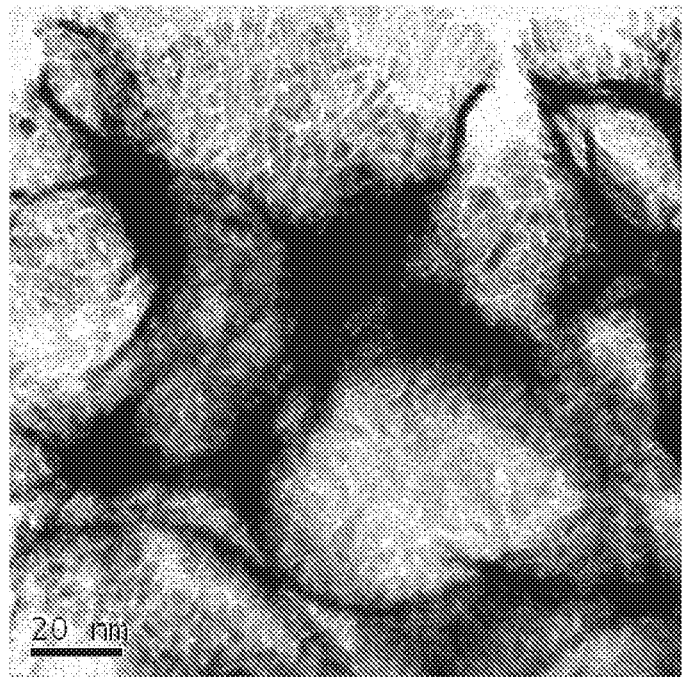
FIG. 2 presents TEM images of foam-like nanospheres comprising a plurality of nanosheets. 2a: A portion of a foam-like nanospheroid (ball) showing branches comprising original dendritic structure. 2b: A portion of a foam-like nanospheroid after 75-hour operation as a catalyst in a membrane electrode assembly (MEA) showing the porous structure that has replaced the original dendritic structure.
Figure 2B:
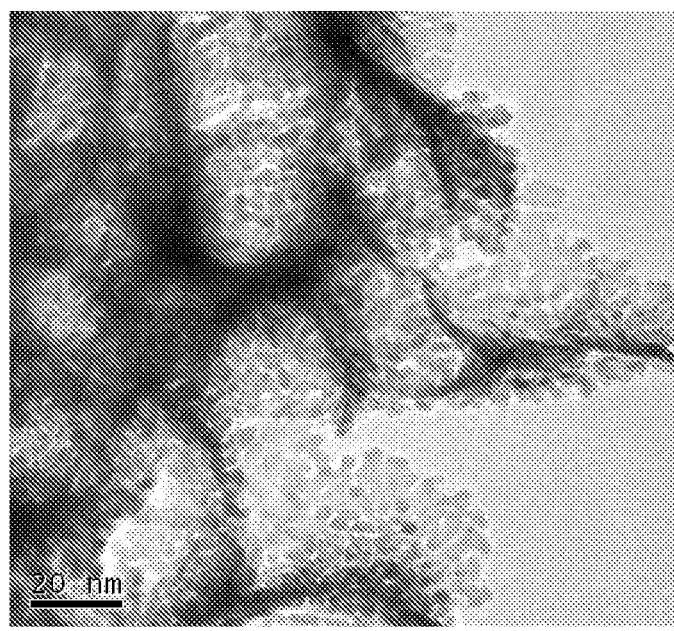

FIG. 2b presents a TEM of a nanospheroid after operation for 75 hours as the catalyst in an MEA. The dendritic branches observed in the dendritic nanospheroid in FIG. 2a are replaced by a porous morphology, as shown in FIG. 2b.

The electrochemically active surface areas (ECAs) of the MEA cathodes were measured before and after the potentiostatic tests to investigate the relationship between current density and ECA. The ECAs were determined from the hydrogen adsorption-desorption features in cyclic voltammetry experiments After the stability tests, the ECAs for MEAs prepared from the nanospheres, the nanosheets, and the Pt black had declined by 27% (11.3 to 8.2 m$^2$/g), 36% (6.4 to 4.1 m$^2$/g), and 42% (5.9 to 3.4 m$^2$/g), respectively. Therefore, the decreases in ECA follow the same trend as the decreases in fuel cell current density. Notably, despite a significant loss in ECA, the Pt-nanosphere MEA sustains a constant current density (FIG. 5). This suggests that the effect of active surface area loss for the Pt nanospheres is obscured by other factors, e.g. mass-transfer limitations occurring in the complex MEA system, or the area loss is compensated for by some other effect, e.g. an increase in specific activity. Regardless of the reason for the constant fuel cell performance of the Pt nanospheres, it is clear that they retain significantly more active surface area over time than the other unsupported Pt nanomaterials.

The superior preservation of the active surface area by the dendritic Pt nanostructures has been investigated by obtaining cross-section scanning TEM images of the MEAs (7 mg Pt/cm$^2$) after the 75-h runs (FIG. 2b). This image shows that the dendritic structure of the original Pt nanospheroid has retained its general morphology as a foam-like material while the dendritic structure of the original dendritic Pt nanosheets comprising the nanospheroid have been converted into porous sheets with many 2-5 nm pores in the sheets. This is in stark contrast with the particles of Pt black, which fuse and grow in size giving particles ranging from a starting size of approximately 5 nm to between 10 and 30 nm in diameter after 75 hours of MEA operation. The preservation of the sheet morphology and creation of long-lived nanopores during MEA operation is unique to the dendritic sheets.

Figure 6:
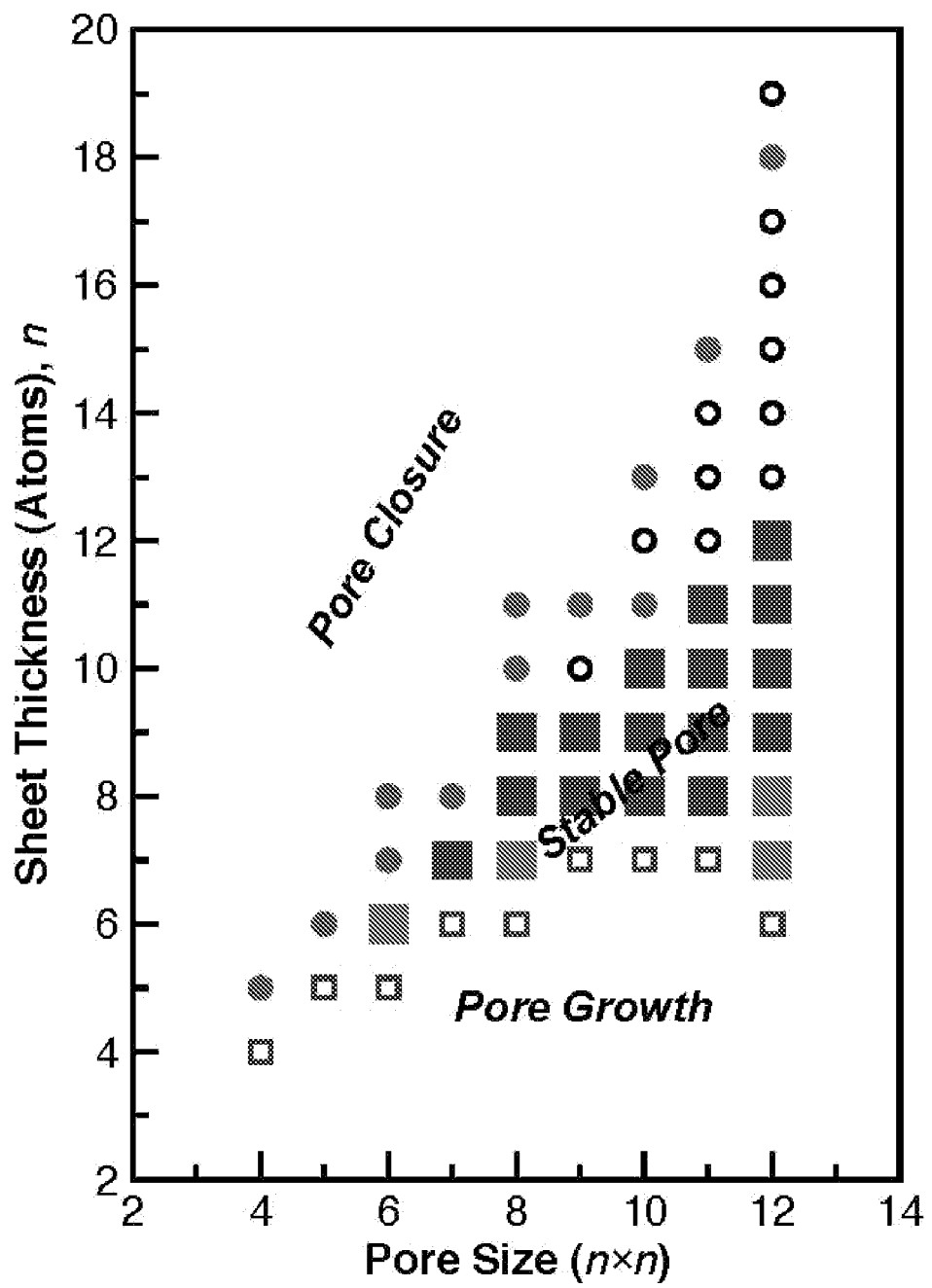
FIG. 6 illustrates some calculated relationships between Pt nanosheet thickness and pore size that correspond to pores that contract and disappear (circles) and pores that are stable or growing (solid squares) or break through the edge of a 40×40 site nanosheet (open squares).

The materials of this present invention have some significant advantages over conventional nanoparticles for use as catalysts where durability is desired. For the isolated particles, dissolution/diffusion processes cause the particles to ripen, i.e., small particles disappear and large particles become larger. Other processes, such as corrosion, may cause some particles to become disconnected from the support and migrate until they come into contact with other Pt particles where they rapidly coalesce into a single large particle, greatly lowering the surface area. For the porous nanosheets, the holes may also slowly ripen, i.e., holes significantly smaller than a critical size become smaller and eventually disappear while holes significantly larger than a critical size become larger and eventually can tear the sheet if sufficiently close to the edge. However, if many of the holes are near the critical size (determined by the sheet thickness), then they persist for long times, oscillating about the critical size. The calculated dependence of pore stability in Pt nanosheets is illustrated in FIG. 6 for some thicknesses between 4 and 20 atom layers and for pore sizes from 4 to 12 atomic diameters in a nanosheet with lateral dimensions of 40×40 atomic diameters. While the minimum stable pore size is approximately equal to the sheet thickness, the maximum stable pore size will depend on having a radius small enough to usefully retard the diffusion of atoms (based upon the Kelvin equation above) to produce a metastable pore for the desired time and on the size of the nanosheet as sufficiently large pores will break through the edge of the nanosheet. In analogy with particle migration, the holes may also move by surface diffusion of Pt atoms. However, the migration of holes through solid Pt may be very much slower than for free particles in the fluid environment of the fuel cell. These differences in the rates of migration and ripening processes of 'negative' (hole) and 'positive' (particle) spaces can therefore be utilized to generate degradation resistant nanomaterials for use in various industrial applications. We also anticipate that the fundamental differences between the stabilities of negative and positive spaces may extend to other 2- and 3-dimensional topologies.

The performance of MEAs made from dendritic Pt nanomaterials can be related to morphological changes over time, specifically the formation of porous nanosheets that are resistant to further structural degradation. The nanospheroids exhibit less structural change than the flat nanosheets; this may be due to the reduced ability of the nonplanar sheets comprising the spheroids to stack and join in a direction normal to the more planar nanosheets. Both dendritic nanostructures are superior to unsupported Pt black, which exhibits the largest loss of surface area, consistent with the large increase in particle size that occurs after use as an MEA catalyst. Dispersal of the dendritic platinum catalysts (and the porous Pt nanostructures that form from them) on conducting supports is expected to reduce the contacts between dendritic nanostructures and provide another avenue for improving their durability of PEM fuel cells. Due to their extended 2-dimensional structure, these dendritic nanomaterials may also offer other advantages such as more the bulk-like Pt higher specific activity in fuel cell electrocatalysts and as catalysts for other reactions.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A durable porous metal nanostructure, comprising:
a thin metal nanosheet, wherein the thin metal nanosheet has a thickness less than or equal to 20 nm and wherein the thin metal nanosheet has a distribution of pores, wherein a pore lateral dimension is greater than or equal to 80% of the thickness and wherein a structure of the thin metal nanosheet is at least 75% nonbranching.

2. The durable porous metal nanostructure of claim 1, wherein the pore lateral dimension is less than or equal to five times the thickness.

3. The durable porous metal nanostructure of claim 1, wherein the thickness is greater than or equal to approximately 6 atomic layers.

4. The durable porous metal nanostructure of claim 1, wherein the thin metal nanosheet has a surface area of at least 120% of a surface area of a solid sheet with a set of lateral dimensions approximately the same as a set of lateral dimensions of the thin metal nanosheet.

5. The durable porous metal nanostructure of claim 1, wherein the distribution of pores is nonperiodic.

6. The durable porous metal nanostructure of claim 1, wherein the durable porous metal nanostructure comprises a plurality of thin metal nanosheets combined to form a foam-like structure.

7. The durable porous nanostructure of claim 6, wherein the foam-like structure is a foam-like spheroid.

8. The durable porous metal nanostructure of claim 1, wherein a metal of the thin metal nanosheet is selected from the group consisting of Pt, Pd, Au, Ag, Ir, Ru, and Rh.

9. A method for making a durable perforated metal nanostructure comprising:
preparing a dendritic metal nanostructure, wherein the dendritic metal nanostructure comprises a two-dimensional sheet of branches with gaps between branches; and
inducing diffusion by elevating a temperature of the dendritic metal nanostructure to close at least 75% of the gaps between branches to form pores to make the durable perforated metal nanostructure.

10. The method of claim 9, wherein a thickness of the two-dimensional sheet is less than or equal to approximately 10 nm.

11. The method of claim 9, wherein the branches of the dendritic metal nanostructure have substantially a uniform thickness except at tips of the branches.

12. The method of claim 9, wherein a ratio of a thickness of the two-dimensional sheet and the gaps between branches is between approximately 3 and approximately 1.

13. The method of claim 9, wherein the dendritic metal nanostructure comprises a plurality of two-dimensional sheets that are combined to form a foam-like structure.

14. The method of claim 13, wherein the foam-like structure is a foam-like spheroid.

15. The method of claim 13, wherein the foam-like structure has an irregular shape.

16. The method of claim 9, wherein the dendritic metal nanostructure comprises a plurality of two-dimensional sheets that have combined to form a nanocage.

17. The method of claim 9, wherein a metal of the durable perforated metal nanostructure is selected from the group consisting of Pt, Pd, Au, Ag, Ir, Ru, Rh, and alloys thereof.

18. The method of claim 9, wherein the step of inducing diffusion employs at least one of heating by electrical current, irradiating with light, irradiating with charged particles, and heating by at least one of convection and conduction.

19. The method of claim 9, wherein the step of inducing diffusion comprises causing at least one chemical reaction at a surface of the dendritic metal nanostructure, wherein the at least one chemical reaction is selected from the group consisting of a catalytic reaction, an electrochemical reaction, a coordination reaction, an acid-promoted solution-surface interaction, and a base-promoted solution-surface interaction.

* * * * *